United States Patent [19]

Barnsley

[11] Patent Number: 5,444,560
[45] Date of Patent: Aug. 22, 1995

[54] OPTICAL CLOCK RECOVERY

[75] Inventor: Peter E. Barnsley, Ipswich, England

[73] Assignee: British Telecommunications public limited company, London, England

[21] Appl. No.: 64,150

[22] PCT Filed: Nov. 18, 1991

[86] PCT No.: PCT/GB91/02030

§ 371 Date: Aug. 2, 1993

§ 102(e) Date: Aug. 2, 1993

[87] PCT Pub. No.: WO92/09159

PCT Pub. Date: May 29, 1992

[30] Foreign Application Priority Data

Nov. 16, 1990 [GB] United Kingdom ................. 9025014
May 7, 1991 [GB] United Kingdom ................. 9109762

[51] Int. Cl.$^6$ ..................... H04J 14/08; H04B 10/00
[52] U.S. Cl. ..................................... 359/138; 359/158
[58] Field of Search ............... 359/135, 138, 158, 173, 359/176, 179, 181, 184–186

[56] References Cited

U.S. PATENT DOCUMENTS 5,339,185 8/1994 Kaede ................................. 359/158

OTHER PUBLICATIONS

"Clock Extractor Using Saturable Association in a Semiconductor Nonlinear Optical Amplifier" Barnsley et al., IEEE Photonics Technology Letters vol. 3, No. 9, Sep. 1991, pp. 832–834.
"Absorptive nonlinear semiconductor amplifiers for fast optical switching", Barnsley et al., SPIE, vol. 1378 Optically Activated Switching (1990), pp. 116–126.
"Optical Digital High-Speed Transmission; General Considerations and Experimental Results", Albrecht et al., IEEE Photonics Transactions on Microwave Theory and Techniques, vol. 30, No. 10, Oct. 1982, pp. 1535–1547.
"Clock Extraction Using Saturable Absorption in a Semiconductor Nonlinear Optical Amplifier", Barnsley et al., IEEE Photonics Technology Letters, vol. 3, No. 9, Sep. 1991, pp. 832–834.
"Coherent Optical Tapping Using Semiconductor Optical Amplifier", Emura et al., IEEE Photonics Technology Letters, vol. 2, No. 8, Aug. 1990, pp. 565–567.
"All-Optical Timing Extraction Using a 1–5µm Self Pulsating Multielectrode DBF LDF", Jinno et al., Electronics Letters, vol. 24, No. 23, 10 Nov. 1988, pp. 1426–1427.
"Optical Retiming Regenerator Using 1–5µm Wavelength Multielectrode DFB LDs", Jinno et al., Electronics Letters, vol. 25, No. 20, 28 Sep. 1989, pp. 1332–1333.
"Broadband Operation of InGaAsP–InGaAs Grin-S-C-MQW BH Amplifiers with 115 mW Output Power", Bagley et al., Electronics Letters, vol. 26, No. 8, 12 Apr. 1990, pp. 512–513.

Primary Examiner—Leo H. Boudreau
Assistant Examiner—K. Negash
Attorney, Agent, or Firm—Nixon & Vanderhye

[57] ABSTRACT

A method of generating a clock signal from a digital optical data signal not having a significant clock component, wherein the digital optical data signal is input into an opto-electronic device and the non-linear variation in the opto-electronic device caused by the digital optical data signal in the device is detected, resulting in the generation of a further signal from the device. A component at a clock frequency for the digital optical data signal is extracted from said further signal.

21 Claims, 5 Drawing Sheets

OPTICAL CLOCK RECOVERY

FIELD OF THE INVENTION

This invention relates to clock recovery, and in particular to the recovery of a clock signal from a digital optical data signal in which there is no significant component at the clock frequency.

BACKGROUND OF THE INVENTION

In return-to-zero (RZ) coding the frequency spectrum of a coded signal will include a strong peak at the clock frequency. The presence of such a strong peak means that clock recovery can be achieved simply by filtering at the clock frequency.

In non-return-to-zero (NRZ) and similar coding systems there is no such peak in the frequency spectrum of the coded signals. Indeed, the frequency spectrum of such signals will show a dip to near zero power at the clock frequency. Consequently, with NRZ and similar coding systems, it is not possible simply to filter out a component at the clock frequency in order to perform clock recovery.

The most common form of digital coding in which the coded data contains no significant component at the clock frequency is NRZ coding. For ease and clarity of description, the present invention is described herein with reference to NRZ data and NRZ coding. It is to be understood, however, that the invention is also applicable to coding systems which are not, strictly-speaking, NRZ, but which nevertheless produce data streams which do not contain a significant component at the clock frequency, and for which clock recovery is required. Hence, throughout the description, unless the context clearly requires otherwise, references to NRZ systems should be taken to include systems which are not NRZ but to which the present invention is nevertheless applicable.

For processing NRZ coded data signals, it is necessary to generate a clock signal synchronous with the data signals. In processing NKZ optical signals, it is conventional simply to convert the NRZ optical signals into NRZ electrical signals, the NRZ electrical signals then being processed electronically to generate a clock signal. If the signal processing is being carried out preparatory to onward transmission of optical NRZ signals, further conversion is required to generate NRZ optical signals from the processed NRZ electrical signals. Such conversion, which is currently employed in regenerators and at exchanges, is disadvantageous for several reasons. Thus, in regenerators, the complexity and power consumption of the requisite electronic circuitry are limiting factors. Moreover, both in exchanges and regenerators, the use of electronic processing imposes, in the long-term, an upper limit on the optical bit-rate used.

The need for this electronic processing also stands in the way of the realisation of one of the next major advances sought in optical telecommunications, namely all-optical routing.

SUMMARY OF THE INVENTION

The present invention provides a technique whereby a synchronous clock signal can more readily be generated. The technique can also be used in applications in which a received optical signal is passed for onward transmission without regeneration, a clock signal being generated from an input optical signal without destruction of that input signal. The invention is thus applicable to systems for all optical-routing.

The present invention provides a method of generating a clock signal from a digital optical data signal not having a significant clock component, the method comprising the steps of:

a) inputting the digital optical data signal into an opto-electronic device;

b) detecting non-linear variation in the optoelectronic device caused by the digital optical data signal in the device, and generating a further signal from the device by means of said detection; and c) extracting from the further signal a component at a clock frequency for the digital optical data signal.

Advantageously, said non-linear variation includes a non-linear photon density variation, and said further signal includes an optical signal which is amplified by the opto-electronic device, the amplified further signal leaving the opto-electronic device via an optical output.

Preferably, said non-linear variation includes a non-linear variation in electrical carrier concentration, and said further signal includes an electrical signal which leaves the opto-electronic device via an electrical output. In this case, said further signal may be a radio frequency (rf) electrical signal, and the method further comprises the step of amplifying the rf electrical signal, said clock frequency component being recovered from the amplified rf electrical signal by filtering. Conveniently, a SAW filter is used to carry out said filtering step.

The opto-electronic device may comprise a NLOA having a saturable absorber region and a gain region. In this case, the non-linear variation in electrical carrier concentration may be a result of absorptive non-linearities in the saturable absorber region of the opto-electronic device.

The invention also provides apparatus for generating a clock signal, the apparatus comprising a non-linear optical element, means for inputting to the non-linear optical element a digital optical signal not having a significant clock component, the non-linear optical element being such as to detect non-linear variation of the digital optical signal and to generate a further signal as a result of said detection, and means for extracting a clock frequency component for the digital optical signal from said further signal.

Advantageously, the non-linear optical element is constituted by a NLOA having a saturable absorber region and a gain region, and the gain region of the NLOA is separated from the saturable absorber region by an isolation resistance. Conveniently, the isolation resistance has a value lying in the range of from 400 ohms to 5,000 ohms, and preferably is 2,400 ohms.

Preferably, the ratio of the lengths of the saturable absorber region and the gain region of the NLOA lies within the range of from 1:1 to 1:20. In a preferred embodiment, the saturable absorber region is 35 $\mu$m in length and is forwardly biased at 0.9 volts, and the gain region is 450 $\mu$m in length and is biased at about 95% of the current for self turn-on.

The NLOA may have uncoated end facets. One end facet may be provided on the saturable absorber region and define an optical input, and the other end facet may be provided on the gain region and define an optical output. In this case, the saturable absorber region may be provided with an electrical output, said non-linear variation may include a non-linear variation in electrical carrier concentration, and said further signal may be an electrical signal which leaves the NLOA via the electrical output.

Conveniently, a SAW filter constitutes the means for recovering the clock frequency component from said electrical signal. Preferably, the apparatus further comprises a bandwidth-limiting low-pass filter downstream of the SAW filter, and an amplifier upstream of the SAW filter.

BRIEF DESCRIPTION OF THE INVENTION

The invention will now be described in greater detail, by way of example, with reference to the accompanying drawings, in which.

DETAILED DESCRIPTION OF THE DRAWINGS

Figure 1:
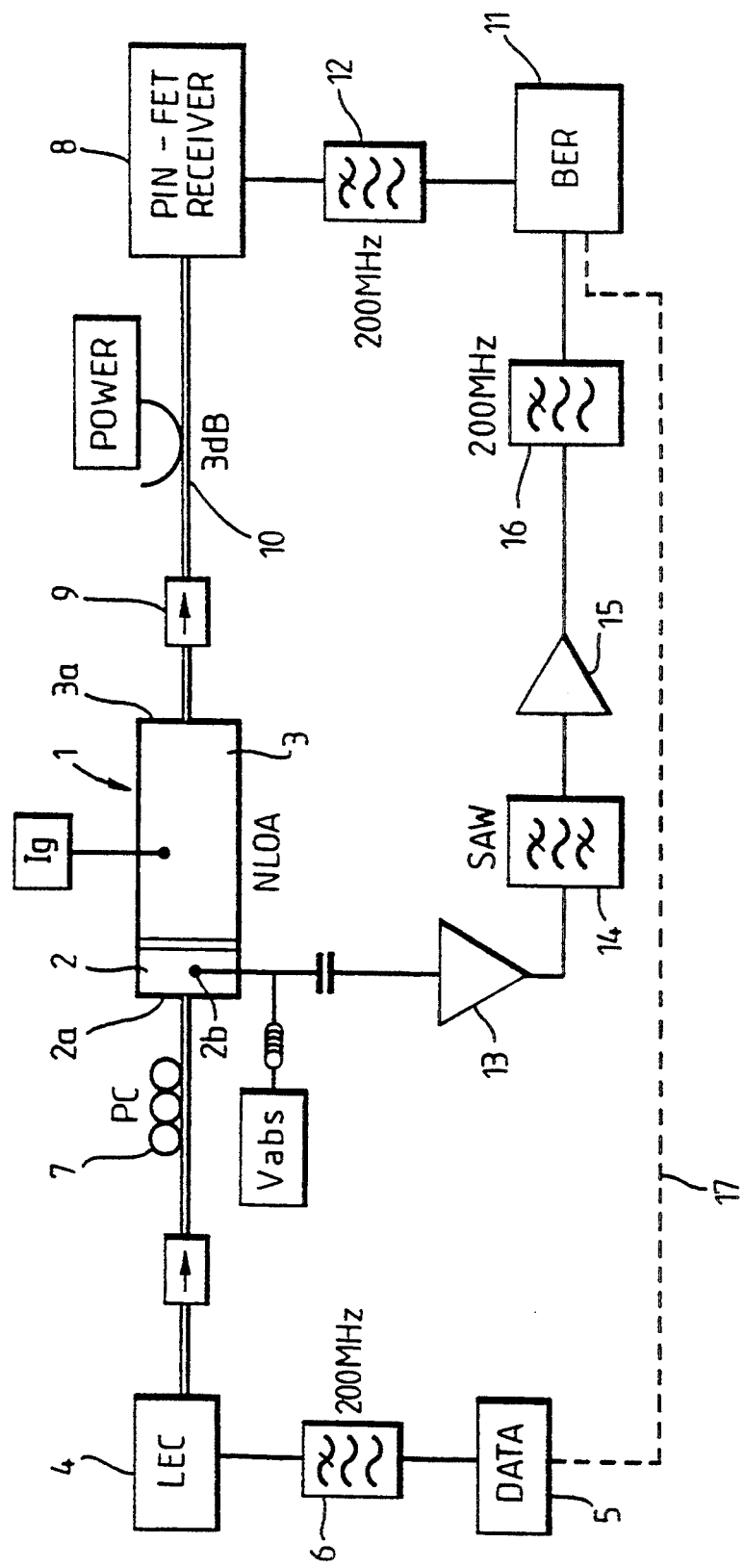
FIG. 1 is a schematic diagram showing an experimental arrangement to demonstrate a clock recovery technique according to the invention.
Figure 2C:
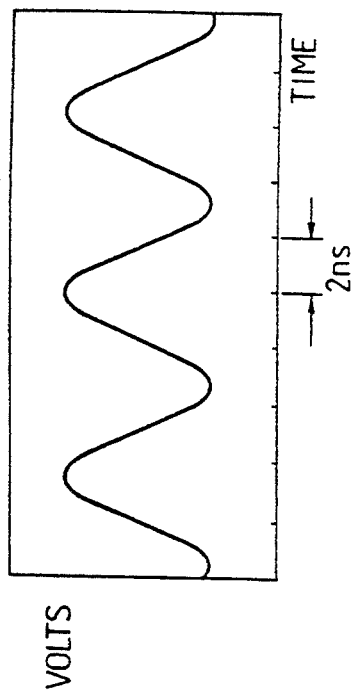
FIG. 2c shows a recovered clock signal at 155.6 MHz corresponding to FIGS. 2a and 2b.
Figure 2D:
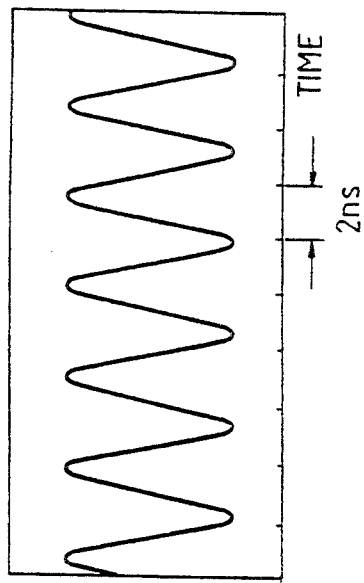
FIG. 2d shows a recovered clock signal at 622 MHz produced using an arrangement like that of FIG. 1 where the input optical data rate is 622 Mbits/sec.
Figure 2A:
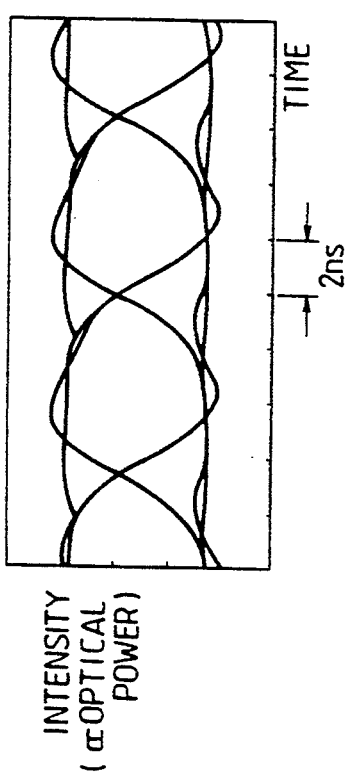
FIG. 2a is an EYE diagram for a 155.6 Mbits/sec NRZ optical signal from the output of the non-linear optical amplifier (NLOA) of FIG. 1 taken at the BER receiver input.
Figure 2B:
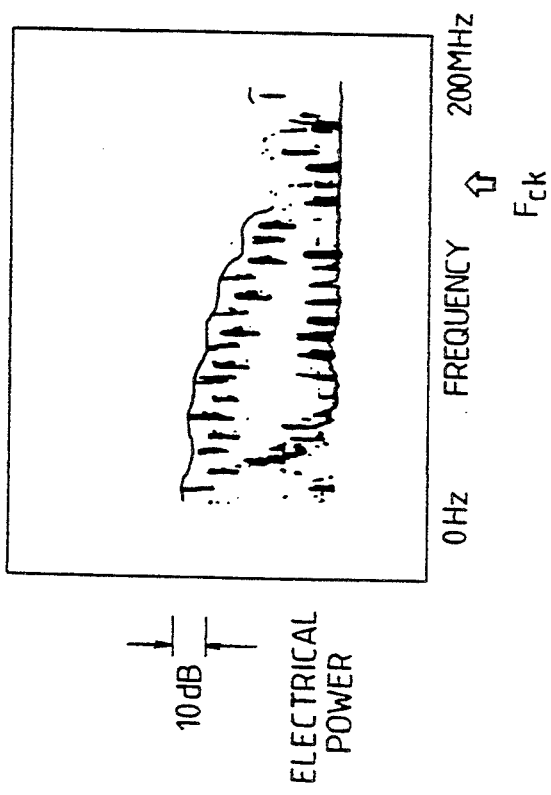
FIG. 2b is an electrical frequency spectrum at the electrical contact of the NLOA showing a strong clock signal at 155.6 MHz.

Referring to the drawings, FIG. 1 shows an experimental arrangement to demonstrate the technique of the invention. For ease of understanding, optical pathways are shown in FIG. 1 by double lines, while electrical pathways are shown by single lines. The FIG. 1 arrangement includes a two contact NLOA 1 having two sections 2 and 3. The section 2 is 35 μm long, is forward biased at 0.9V, and acts as a saturable absorber. The section 3 is 450 μm long, is biased at −95% of the current for self turn-on, ($I_{th}$=73 mA), and acts as a gain section. The isolation resistance between the two sections 2 and 3 is 2.4k ohms.

The end facets 2a and 3a of the NLOA 1 are uncoated, so that the NLOA has end face reflectivities R1 and R2 of about 30%. The end facet 2a of the absorber section 2 acts as an optical input region, and the end facet 3a of the gain section 3 acts as an optical output region. The absorber section 2 is also provided with an electrical contact 2b.

Optical input signals for the NLOA 1 are provided by a single mode, long-external-cavity laser 4 which is modulated by the output of a data generator 5. A 200 MHz bandwidth-limiting, low-pass filter 6 is provided between the data generator 5 and the laser 4. The laser 4 has a centre wavelength of 1.555 μm, and the data generator 5 supplies a 155.6 Mbits/sec PRBS in NRZ format (optical on/off ratio=13:1). The mean input signal power at the NLOA input facet 2a is −45 μW, and the input signal wavelength is tuned to one of the NLOA's Fabry-Perot (FP) modes. The polarisation sensitivity of this device is between 1 and 5 dB, and is wavelength dependent. For this reason, a polarisation controller 7 is provided upstream of the NLOA 1 to maintain the polarisation (TE in this case) of the input signal.

The optical output of the NLOA 1 is fed to a PIN-FET receiver 8 via an isolator 9 and a 3 dB coupler 10. The electrical output of the receiver 8 is fed to a bit-error rate (BEE) receiver 11 via a 200 MHz bandwidth-limiting, low-pass filter 12. The electrical output of the NLOA 1 is also fed (from the contact 2b) to the BEE receiver 11 via an amplifier 13, a surface acoustic wave (SAW) filter 14 (Q=300, f=155.6 MHz, loss=17 dB), an amplifier 15 and a 200 MHz bandwidth-limiting, low-pass filter 16.

The operation of the NLOA 1 will now be described with reference to FIGS. 2a to 2d. The optical output of the NLOA 1 shows absorptive non-linear pulse shaping (output mark/space ∼1.5, on/off ratio 9:1) and a fibre-fibre TE gain of 4.5 dB (see FIG. 2a). This non-linear pulse shaping is a result of the saturation process that occurs in the saturable absorber section 2 of the NLOA 1. Thus, at a certain input signal power (the switching threshold), the photon density is sufficient to cause a slight reduction in absorption due to the increase in carrier density caused by the absorption of photons. The reduction in absorption increases the net gain of the amplifier, leading to a further increase in photon density and hence a further reduction in absorption. This positive feedback results in a very fast non-linear reduction in absorption, and causes the output to switch from the "off" state to the "on" state. After switching, the photon density is sufficient to saturate the gain, and any further increase in the input power produces no increase in the output power. When the input power falls below a "switch-off" threshold, the photon density is insufficient to keep the absorber section 2 saturated, and so absorber recovery occurs. The speed of absorber recovery is not as fast as the saturation process, since there is still a photon density within the NLOA 1 which opposes the recovery process.

This process results in carrier density variations within the saturable absorber section 2 that follow the optical intensity variation (∼100 ps risetime, 500 ps fall time). The carrier density variation generates an electrical data signal whose frequency spectrum shows a clock component $F_{ck}$ at a power similar to that of the low frequency data components (see FIG. 2b). This clock component only exists when the NLOA output shows absorptive non-linear switching, and is obtained over a 19 GHz optical frequency range at each FP mode within about 60 nm of the gain peak wavelength. However, what is important is the saturation of the absorption, and this can be achieved with optical inputs at wavelengths much further from the wavelength of the gain peak. For example, with this 1.55 μm NLOA 1, clock recovery can be achieved with input wavelengths as short as 1.3 μm. The clock signal level is related to the strength of the non-linearity of the NLOA 1. When the rf electrical signal from the electric contact 2b is amplified, and filtered using the SAW filter 14, a stable clock signal is obtained (see FIG. 2c) for data pattern lengths up to $2^{10}-1$ PRBS. It has been found that the low-pass filter 16 downstream of the SAW filter 14 is necessary to remove frequency components passed by higher resonance orders of the SAW filter. For a $2^{15}-1$ PRBS, the limiting Q of the SAW filter 14 results in periodic loss of the clock signal.

In practice, as already mentioned, NRZ data generally contains a small (relative to the components at other frequencies) component at the clock frequency. Passage through the NLOA 1 does, however, produce a component at the clock frequency at the electrical contact 2b, and there is also a significant increase in the level of that optical component in the optical output signal. Typically, the optical power increase is in the region of 20–25 dB. This relatively strong clock component in the modulation spectrum of the optical data output from the NLOA 1 may allow all-optical clock extraction at a subsequent node element using one of the methods applicable to RZ data described by Jinno et al in Electronic Letters, Vol 24, 23, pp 1426–1427, and vol 25, 20, pp 1332–1333, or some other technique.

Figure 3:
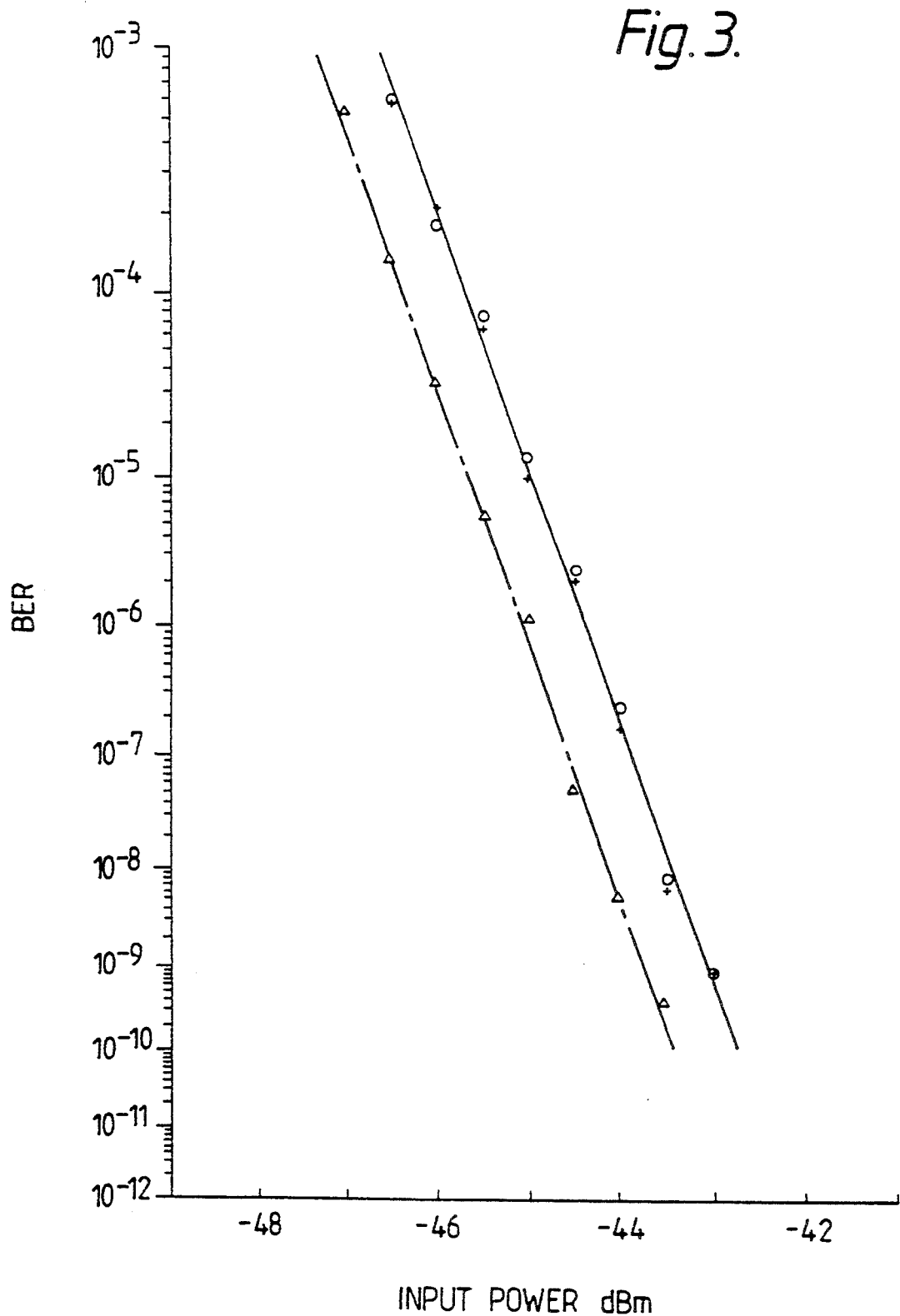
FIG. 3 is a graph of bit-error-ratio at 155.6 Mbits/sec; showing the relative quality of the recovered clock signal compared with measurements using the transmitted clock.

FIG. 3 shows the bit-error-ratio (BER) measurements on $2^7-1$ PRBS data transmitted by the NLOA 1. This figure shows the BER for the 155.6 Mbits/sec data where the BER receiver 11 is synchronised using the clock from the data generator 5 via a line 17 (a sneak clock), and the recovered clock signal shown in FIG. 2c. It is noteworthy that the measurements showed no optical receiver sensitivity penalty when using the NLOA generated clock (as compared with sneak clock signal) as the receiver clock signal. FIG. 3 also shows the back-to-back measurement where the optical data from the laser 4 by-passes the NLOA 1 and is incident directly on the receiver 8. The back-to-back measurement is, therefore, an indication of the true output of the laser 4. The back-to-back plot thus shows the best possible BER achievable, and so FIG. 3 shows that the NLOA 1 adds a small system penalty.

Transmission through the NLOA 1 does modify the output data on/off ratio (0.3 dB penalty), and mark/space ratio (0.4 dB penalty) but the penalties are minor. The same receiver sensitivity is observed for $2^{10}-1$ data using the recovered clock signal for synchronisation. The penalty due to changes in signal mark-space ratio is sensitive to input power, device "drive" currents and input signal detuning (from the relevant FP peak). It is believed that at least some reduction in this penalty should be achievable, not least through optimisation of the device reflectivities. The penalty due to a drop in contrast is principally caused by amplifier noise resulting from spontaneous emission. Optical filtering should be effective in reducing this penalty.

Even without any reduction in these penalties, it is clear that the present invention is suitable for use in signal routing applications. The arrangement in FIG. 1 has an operating limit of ~500 MHz to the clock component generation using the NLOA 1 as a result of the slow recovery time of the absorber section 2 (1–2 ns for bulk material), but this can be improved by optimisation of materials and device construction. For example, due to its lower confinement factor, Quantum Well (QW) material can have a shorter carrier lifetime than an equivalent bulk structure due to the higher carrier densities. A similar NLOA to that described above can be fabricated using 4-well QW material of the type described in "Broadband operation of InGaAsP/InGaAs GRIN-SC-MQW BH amplifiers with 115 mW output power", by Bagley et al, Electron. Lett, 26, 8 pp 512–513, 1990. This QW NLOA allows for stable clock generation from 622 MBit/s $2^7-1$ NRZ data using the same technique (see FIG. 2d).

Figure 5A:
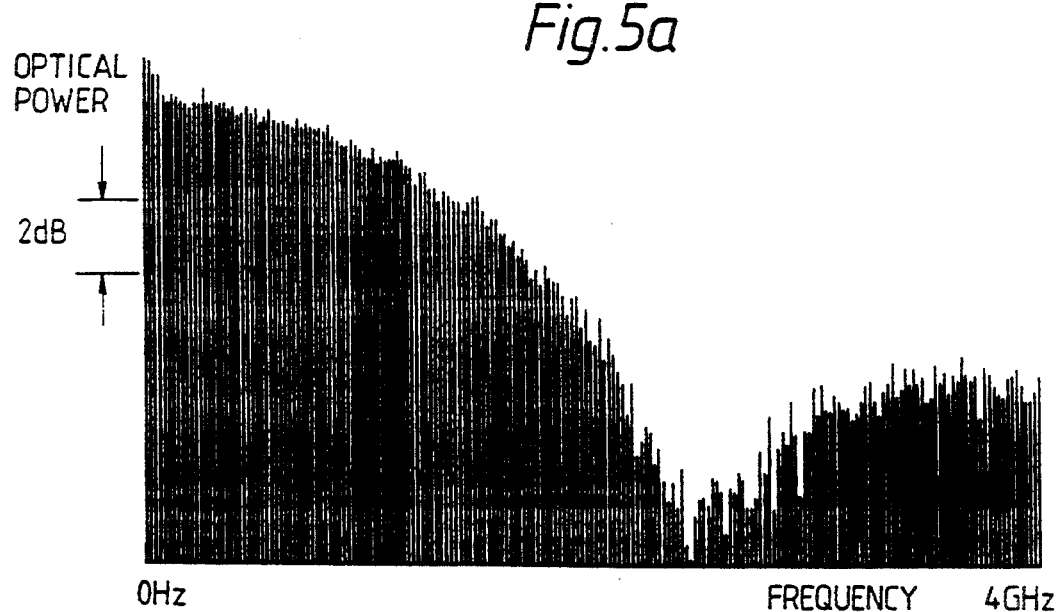
FIGS. 5a & 5b are modulation spectra for 2.5 Gbits/sec $2^7-1$ NRZ optical data upstream and downstream the NLOA.
Figure 5B:
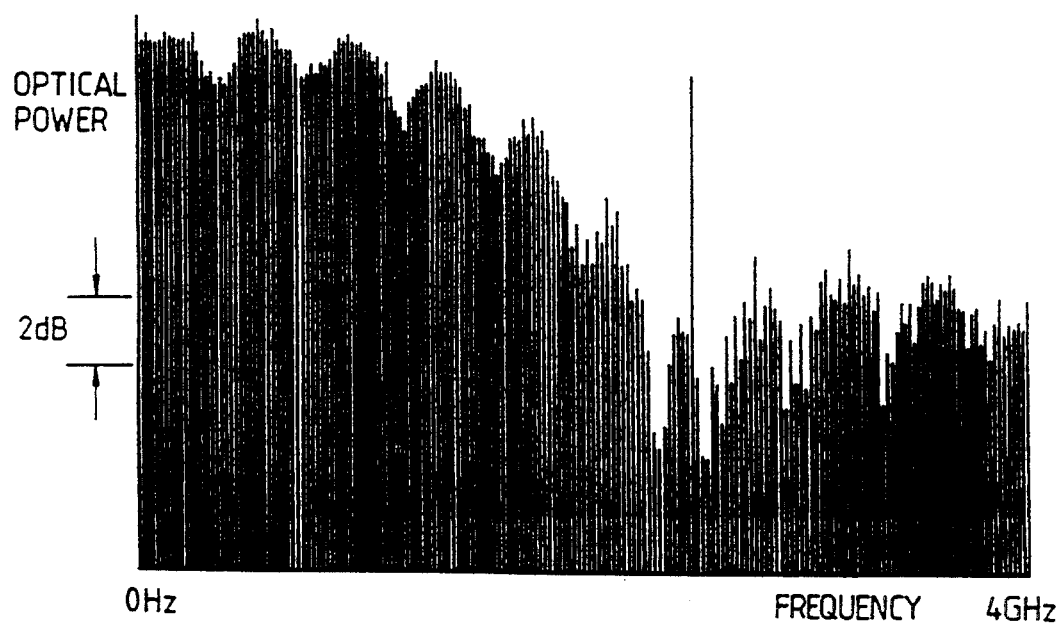

A strong clock signal is also produced when 2.5 GBit/s NRZ data is injected into the device. For this case, the optical data modulation spectra upstream and downstream of the QW NLOA, measured using a Lightwave Analyser, are shown in FIGS. 5a and 5b respectively. A comparison of these figures shows the presence of a strong clock component $F_{ck}$ at 2.5 GHz, this clock component being generated by transmission through the QW NLOA. A similar clock component is also generated at 5 GHz when 5 GBit/s NRZ data is injected, although this modulation rate is near the limit of response of this particular NLOA and the clock component's powers level is 6 dB lower than at 2.5 GHz. In order to extract clock components when using this type of QW NLOA, phase-locked loop techniques are suitable for use in place of the SAW filters 14.

Figure 4:
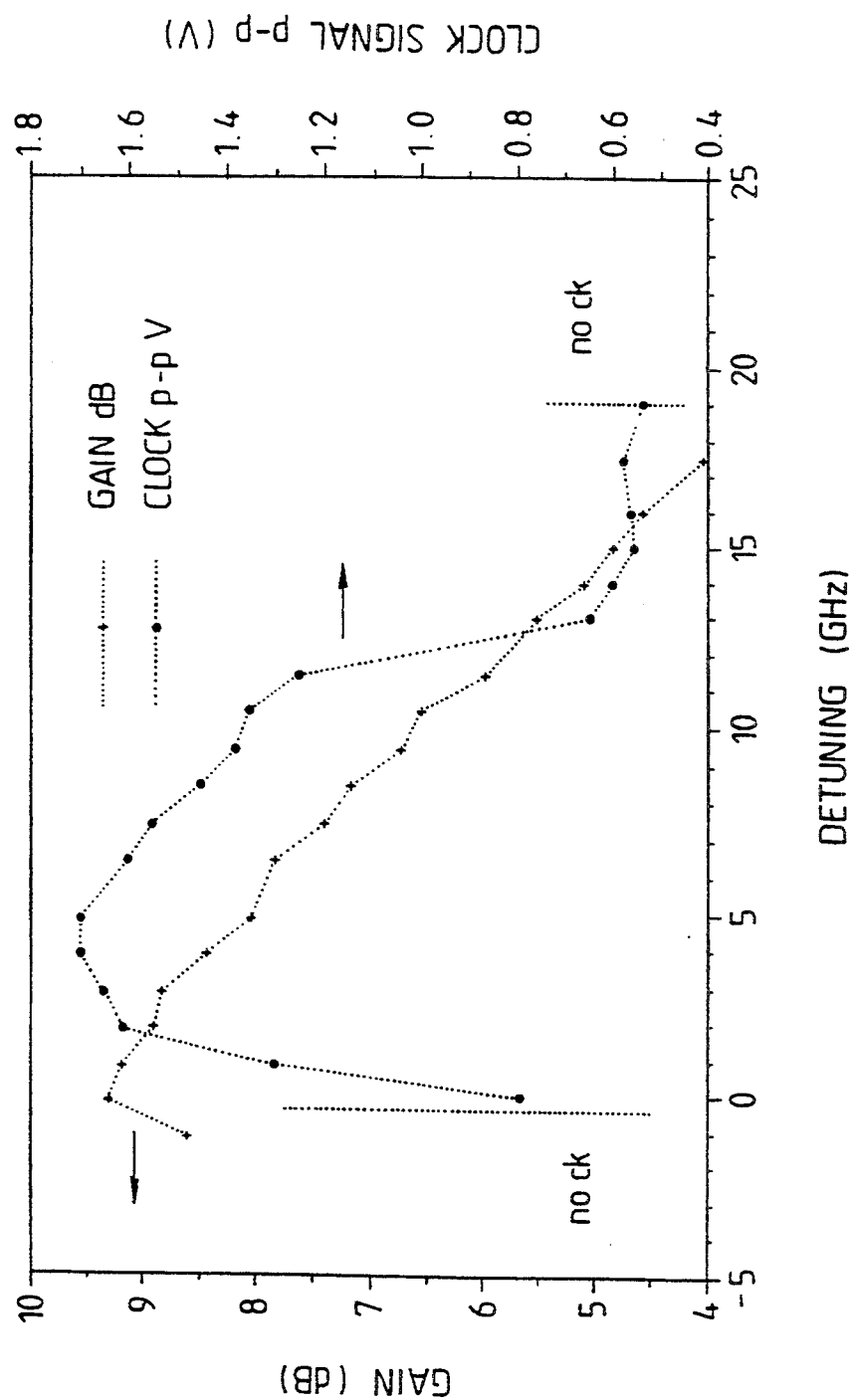
FIG. 4 shows the variation of non-linear gain and clock voltage with input optical signal frequency near a Fabry Perot mode for the NLOA of FIG. 1.

In order to verify that the clock signal is generated due to the optoelectronic non-linearity, the input optical signal wavelength is detuned across an NLOA FP mode. The results are shown in FIG. 4. Zero detuning is defined as the optical signal wavelength for maximum measured signal gain. At this wavelength the change in output power, p, as the NLOA switches is low. The strength of the generated clock signal is also low. For negative detunings, gain saturation dispersion is dominant, and in this region no clock component is seen. For positive detunings, $\delta P$ increases and then reduces but remains large over ~10 GHz. The clock signal is strongest in this detuning region. For further detuning $\delta P$ and the clock signal remain small. FIG. 4 shows that the strength of the generated clock signal is strongly related to the strength of the absorptive non-linearity.

The absorptive non-linearity generates the required frequency component which, after narrow band electrical filtering, results in a stable clock signal. This type of clock recovery is clearly suitable for multi-GBit/s optical processing and routing applications.

The results shown in FIG. 4 are generated using an NLOA having uncoated facets, that is with reflectivities of about 30 percent on the input and output facets 2a and 3a. Clearly, such a construction is potentially resonant, and will exhibit a strongly FP character. This has the effect of increasing the input sensitivity of the device, so that the device will exhibit non-linearity with lower input powers which will often be desirable. At the same time, however, a strong FP character also means that the device will be more strongly wavelength sensitive. The sensitivity to detuning which is illustrated by FIG. 4 can be reduced by reducing the reflectivities of the facets.

Where the NLOA has one facet 2a associated with the absorber section 2 and one facet 3a associated with the gain section 3, there are advantages in reducing at least the reflectivity of the absorber facet. There are also advantages in reducing the reflectivities of both facets 2a and 3a. Similar operation to that described above occurs when the input facet is provided on the gain region 3 of the NLOA 1.

With NLOAs of the general form shown in FIG. 1, that is having a single absorber section 2 and a single gain section 3, the gain section being much longer than the absorber section, the facet reflectivities can range from 30 percent to 0.1 percent (for example by having anti-reflection (AR) coatings on the end facets 2a and 3a, or by angling these end facets). Acceptable clock recovery is achieved in each case. For example, with the absorber end facet coated to give a residual reflectivity of about 0.1%, the 10 GHz range shown in FIG. 4 is broadened to 30 GHz. Although sensitivity to detuning is decreased with devices having reduced reflectivity facets, the input power required to access the non-linearity increases. As a general rule, where one is utilising absorptive non-linearity to achieve clock recovery according to the invention, it is preferable to operate with the lowest reflectivity coatings (or rather the lowest $R_1R_2$ product) which will still give rise to absorptive switching whilst maintaining acceptably low switching thresholds.

Thus far the invention has been described with reference to non-linear optical elements in which the non-linearity which is utilised to achieve clock recovery is absorptive non-linearity. This is indeed the preferred mode of putting the invention into effect. It is possible, however, to use dispersive histability in place of absorptive bistability. Thus, since both gain and absorber saturation occur in an NLOA, pulse shaping can result from both absorption and dispersive non-linearities. Consequently, clock generation/recovery can occur as a result of saturation within the gain section of the NLOA 1. Dispersive bistability also arises, for example, with simple FP semiconductor laser diodes, which do not have a separate absorption section, when the device is driven into saturation. As in the absorptive bistability case, it is expected that clock recovery can be achieved when a change in the NRZ input optical signal causes an observable change in the carrier density within the device which is operating non-linearly. With a non-adsorptively bistable Fabry Perot device, in the dispersively non-linear regime of gain saturation, there is a fall in carrier density which produces a fall in the gain. Under the right circumstances, therefore, an electrical component at the clock frequency would be observable at the electrical contacts of the FP laser. With an appropriately tuned electrical filter or tuned electrical amplifier the clock signal can be recovered.

It will be apparent that the clock recovery technique of the invention could utilise other forms of non-linear optical events than an NLOA, provided the photon and carrier population of such elements can be coupled in some way. Examples of non-linear devices suitable for use in the present invention are described in our PCT patent application WO 89/10579 which is herein incorporated by way of reference.

An example of a non-linear device suitable for use in the present invention is described in the paper entitled "Absorptive nonlinear semiconductor optical amplifiers for fast optical switching", given by Barnsley et al at the SPIE symposium on optically activated switching, Boston, U.S.A., on 5 Nov. 1990. The clock recovery technique of the invention is also described in "Clock Extraction Using Suitable Absorption in a Semiconductor Nonlinear Optical Amplifier" (IEEE Photonics's Technology Letters, Vol. 3 No. 9, Sept. 1991, pages 832-834—P. E. Barnsley and P. J. Fiddyment).

I claim:

1. A method of generating a clock signal from a digital optical data signal, said data signal containing no significant frequency spectrum clock component at the data system clock frequency, the method comprising the steps of:
    a) inputting the digital optical data signal into an opto-electronic device;
    b) detecting a non-linear variation in the opto-electronic device caused by the digital optical data signal in the device, and generating a further signal from the device in response to said detection; and
    c) extracting from the further signal a component at the clock frequency of the digital optical data signal.

2. A method as claimed in claim 1, wherein said non-linear variation includes a non-linear photon density variation, and said further signal includes an optical signal which is amplified by the opto-electronic device, the amplified further signal being outputted by the opto-electronic device via an optical output.

3. A method as claimed in claim 1, wherein said non-linear variation includes a non-linear variation in electrical carrier concentration, and said further signal including an electrical signal which is output by the opto-electronic device via an electrical output.

4. A method as claimed in claim 3, wherein said further signal is an rf electrical signal, and the method further comprises the steps of amplifying the rf electrical signal, and recovering said clock frequency component from the amplified rf electrical signal by filtering.

5. A method as claimed in claim 4, wherein a standing acoustic wave filter is used to carry out said filtering step.

6. A method as claimed in claim 3, wherein the opto-electronic device comprises a non-linear optical amplifier having a saturable absorber region and a gain region.

7. A method as claimed in claim 6, wherein the non-linear variation in electrical carrier concentration is a result of absorptive non-linearities in the saturable absorber region of the opto-electronic device.

8. A method as claimed in claim 1, wherein the opto-electronic device comprises a non-linear optical amplifier having a saturable absorber region and a gain region.

9. Apparatus for generating a clock signal, the apparatus comprising a non-linear optical element, means connected to the non-linear optical element for inputting a digital optical signal, said digital optical signal containing no significant frequency spectrum clock component at the signal clock frequency, the non-linear optical element detecting non-linear variation of the digital optical signal and generating a further signal as a result of said detection, and means responsive to said further signal for extracting a clock frequency component for the digital optical signal from said further signal.

10. Apparatus as claimed in claim 9, wherein the non-linear optical element includes a non-linear optical amplifier having a saturable absorber region and a gain region.

11. Apparatus as claimed in claim 10, wherein the gain region of the non-linear optical amplifier is separated from the saturable absorber region by an isolation resistance.

12. Apparatus as claimed in claim 11, wherein the isolation resistance has a value lying in the range of from 400 ohms to 5,000 ohms.

13. Apparatus as claimed in claim 12, wherein the isolation resistance is 2,400 ohms.

14. Apparatus as claimed in claim 10, wherein the ratio of the lengths of the saturable absorber region and the gain region of the non-linear optical amplifier lies within the range of from 1:1 to 1:20.

15. Apparatus as claimed in claim 10, wherein the saturable absorber region is 35 $\mu$m in length and is forwardly biased at 0.9 volts, and the gain region is 450 $\mu$m in length and is biased at about 95% of the current for self turn-on.

16. Apparatus as claimed in claim 10, wherein the non-linear optical amplifier has uncoated end facets.

17. Apparatus as claimed in claim 16, where one end facet is provided on the saturable absorber region and defines an optical input, and another other end facet is provided on the gain region and defines an optical output.

18. Apparatus as claimed in claim 17, wherein the saturable absorber region is provided with an electrical output, and wherein said non-linear variation includes a non-linear variation in electrical carrier concentration, and said further signal is an electrical signal output by the non-linear optical amplifier by an electrical contact.

19. Apparatus as claimed in claim 18, wherein the means for extracting the clock frequency component from said electrical signal includes a standing acoustic wave filter.

20. Apparatus as claimed in claim 19, further comprising a bandwidth-limiting low-pass filter connected to an output of the standing acoustic wave filter.

21. Apparatus as claimed in claim 19 wherein the means for extracting further includes an amplifier connected to an input of the standing acoustic wave filter.

* * * * *